United States Patent [19]
Pharriss

[11] 3,899,587
[45] Aug. 12, 1975

[54] USE OF PROSTAGLANDINS E AND F FOR ABORTION

[75] Inventor: Bruce B. Pharriss, Kalamazoo, Mich.

[73] Assignee: The Upjohn Company, Kalamazoo, Mich.

[22] Filed: Sept. 24, 1973

[21] Appl. No.: 400,460

Related U.S. Application Data

[63] Continuation of Ser. No. 881,296, Dec. 1, 1969, abandoned, which is a continuation-in-part of Ser. No. 756,294, Aug. 29, 1968, abandoned.

[52] U.S. Cl................................ 424/305; 424/318
[51] Int. Cl.² ................ A61K 31/20; A61K 31/215
[58] Field of Search........................... 424/305, 318

[56] References Cited
OTHER PUBLICATIONS

Bygdeman et al. – Am. J. of Obs. & Gyn., Vol. 102, No. 3 (Oct. 1968) pages 317–319.

Viqvist et al. – Am. J. Ost. & Gyn. Vol. 102, No. 3 (Oct. 1968) page 327–332.

Bygdeman et al. – Prostaglandin Proc., 2nd Nobel Symposium, Dec. 1967, pages 93–96.

Viqvist et al. – Nordisk Medicine, Vol. 77 (1967) page 677.

Primary Examiner—Stanley J. Friedman

[57] ABSTRACT

Methods and compositions for administering prostaglandins of the PGF and PGE types to ovulating mammals including animals and humans in the control of the reproductive cycle.

11 Claims, No Drawings

USE OF PROSTAGLANDINS E AND F FOR ABORTION

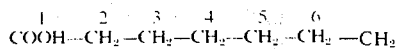
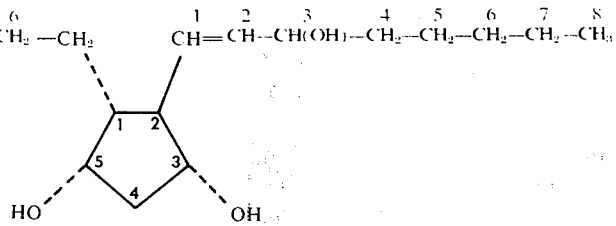

CROSS REFERENCE TO RELATED APPLICATION

This application is a continuation of copending application Ser. No. 881,296, filed Dec. 1, 1969, now abandoned, which is a continuation-in-part of copending application Ser. No. 756,294, filed Aug. 29, 1968, now abandoned.

BRIEF SUMMARY OF THE INVENTION

This invention relates to methods and compositions for controlling the reproductive cycle in ovulating female mammals including humans and animals such as monkeys, rats, rabbits, dogs, cattle, and the like. PGF and PGE types prostaglandins in dosage unit forms of pharmaceutical preparations are administered systemically to the female mammals, the preparations supplying an effective nontoxic amount for controlling the reproductive cycle of a member selected from the group consisting of the free acids, pharmaceutically acceptable salts, acylates wherein the acyl radical is that of a hydrocarbon carboxylic acid having 1 to 8 carbon atoms, inclusive, and carboxylate esters having 1 to 8 carbon atoms, inclusive, of a compound represented by the formula

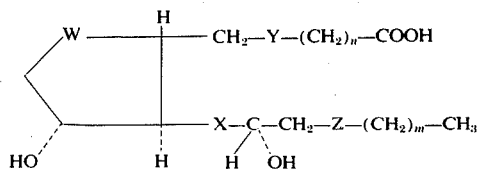

wherein W is $=C=O$ or $=C\begin{smallmatrix}H\\OH\end{smallmatrix}$;

X is $CH_2CH_2$ or trans $CH=CH$ and both Y and Z are $CH_2CH_2$;
X is trans $CH=CH$,
Y is cis $CH=CH$ and
Z is $CH_2CH_2$ or cis $CH=CH$;
m is 0, 1 or 2 and
n is 2, 3, 4 or 5.

DETAILED DESCRIPTION

A crude mixture, called prostaglandin was reported by von Euler, Arch. Exp. Path, Pharm Abs. 175, 78 (1934); 181 (1936); J. Physiol 72, 74 (1931); 81, 102 (1934); 84, 21 (1935) 88, 213 (1936); and Klin. Wschr 14, 1182 (1935). More recently essentially pure crystalline PGF ($PGF_1$ or $PGF_1\alpha$) has been isolated, British Pat. No. 851,827 and Acta Chemica Scandinavica 14, 1693 (1960). Microbiological conversions of unsaturated fatty acids with mammalian glandular tissue are described in U.S. Pat. No. 3,290,226 and 3,296,091. In the latter patent PGF ($PGF_1$ or $PGF_1\alpha$) is designated as 7-[3α, 5α-dihydroxy-2-(3-hydroxy-1-octenyl)-cyclopentyl]-heptanoic acid to conform to the following structure:

The PGF-type prostaglandins are characterized by the presence of the hydroxyl group at the 5-position in the cyclopentane ring. The designation $PGF_1\alpha$ shows the configuration of the hydroxyl at the 5-position. Various other members of the PGF-type are known and are named either systematically or in terms of their relationship to PGF. Illustrative thereof are $PGF_2\alpha$ or 7-[3α-5α-dihydroxy-2-(3-hydroxy-1-octenyl)-cyclopentyl]-5-heptenoic acid, $PGF_3\alpha$ or 7-[3α,5α-dihydroxy-2-(3-hydroxy-1,5-octadienyl)-cyclopentyl]-5-heptenoic acid, and dihydro $PGF_1\alpha$ or 7-[3α,5α-dihydroxy-2-(3-hydroxy-octyl)-cyclopentyl] heptanoic acid. Details of preparations from available materials are disclosed for dihydro $PGF_1\alpha$, $PGF_2\alpha$, and $PGF_3\alpha$ in Biochimica and Biophysica Acta, 84, 707 (1964), and for $PGF_1\alpha$ in U.S. Pat. No. 3,069,322. Bergstrom, Carlson and Weeks, Pharmacological Reviews, Vol. 20, No. 1, 1 (1968) review "The Prostaglandins."

Pharmaceutically acceptable salts for example, those of alkali metals and alkaline earth bases, such as the sodium, potassium, calcium and magnesium salts; those of ammonia or a basic amine such as mono-, di-, and triethyl amines, benzylamine, heterocyclic amines such as piperidine and morpholine, and amines containing water-solubilizing or hydrophilic groups such as triethanolamine and phenylmonoethanolamine are disclosed in U.S. Pat. No. 3,296,091. Carboxylate esters such as methyl, ethyl, cyclohexyl and the like having no more than 8 carbon atoms are formed by the usual methods, e.g., reaction with diazomethane or similar diazohydrocarbons as in U.S. Pat. No. 3,296,091. Acylates of lower alkanoic acids of 1 to 8 carbon atoms, inclusive are prepared in the usual manner by reaction of the respective prostaglandin acids with the appropriate acid anhydride or acid halide, e.g., those of acetic, propionic, butyric, isoburyric, valeric, caproic, caprylic and the like acids, as in Great Britain Pat. No. 1,040,544.

PGF-type prostaglandins in dosage unit forms of pharmaceutical preparations are administered systemically to the female mammals, the preparations supplying an effective nontoxic amount for controlling the reproductive cycle of a member selected from the group consisting of the free acids, pharmaceutically acceptable salts, acylates wherein the acyl radical is that of a hydrocarbon carboxylic acid having 1 to 8 carbon atoms, inclusive, and carboxylate esters having 1 to 8 carbon atoms, inclusive, of a compound represented by the formula

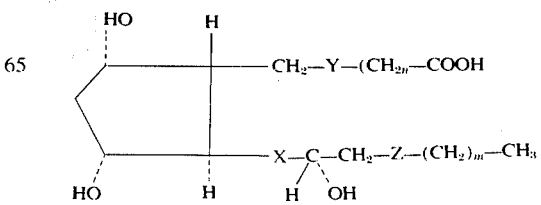

wherein X is $CH_2CH_2$ or trans CH=CH and both Y and Z are $CH_2CH_2$;
X is trans CH=CH,
Y is cis CH=CH and
Z is $CH_2CH_2$ or cis CH=CH;
m is 0, 1 or 2 and
n is 2, 3, 4 or 5.

In the aforesaid U.S. Pat. Nos. 3,290,226 and 3,296,091, PGE compounds are described including $PGE_1$, $PGE_2$, and $PGE_3$. The PGE series is characterized by the presence of the keto group at the 5-position in the cyclopentane ring. More recently, Ramwell et al., "Prostaglandins" in Progress in the Chemistry of Fats and other Lipids, Vol. 9, part 2 edited by R. Holman, pp. 231–273, Pergamon Press, Oxford, 1968 refer to prostaglandin $PGE_1$ as 11α,15(S)-dihydroxy-9-oxo-13-trans-prostenoic acid, $PGE_2$ as 11α,15(S)-dihydroxy-9-oxo-5-cis, 13-trans,17-cis-prostatrienoic acid. $PGE_1$ is converted to dihydro-$PGE_1$, by catalytic hydrogenation as described in Belgian Pat. No. 685,516. As heretofore described, the pharmaceutically acceptable salts, carboxylate esters, acylates of the lower alkanoic acids are prepared in this PGE series also. Hence the compositions and methods provide an effective nontoxic amount of a member selected from the group consisting of the free acids, pharmaceutically acceptable salts, acylates wherein the acyl radical is that of a hydrocarbon carboxylic acid having 1 to 8 carbon atoms, inclusive, and carboxylate esters having 1 to 8 carbon atoms, inclusive, of a compound represented by the formula

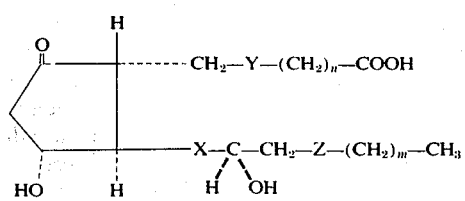

wherein X is $CH_2CH_2$ or trans CH=CH and both Y and Z are $CH_2CH_2$;
X is trans CH=CH,
Y is cis CH=CH and
Z is $CH_2CH_2$ or cis CH=CH;
m is 0, 1 or 2 and
n is 2, 3, 4, or 5.

The above formulae are to be construed herein as including optically active compounds of the natural configuration and, except for the $PGE_3$-type and $PGF_3α$-type compounds, (i.e., wherein X is trans CH=CH, and Y and Z are cis CH=CH,) racemic compounds. All of these compounds are known or can be prepared by known methods. See, for example, U.S. Pat. No. 3,296,091, Rec. Trav. Chim. 85, 1233 (1966), ibid. 87, 461 (1968), J. Am. Chem. Soc. 90, 5895 (1968), and Chemical Communications 303 (1969). The PGFα-type compounds are also prepared by carbonyl reduction of the corresponding PGE-type compounds, advantageously with sodium borohydride according to known procedures. When an active ingredient is named, for example $PGF_1α$, $PGF_2α$, $PGF_3α$, dihydro-$PGF_1α$, $PGE_1$, $PGE_2$, $PGE_3$, dihydro-$PGE_1$, unless the designation racemic or dl is added, the optically active form of the natural configuration is meant.

Corresponding PGF beta compounds are also useful in the compositions and methods of the present invention, for example, $PGF_1β$, $PGF_2β$, $PGF_3β$, dihydro-$PGF_1β$, and the other related PGF-beta compounds in the form of the heretofore described salts, carboxylate esters, and acylates. In this instance (except for $PGF_3β$) the names designate the racemic compounds and the optically active compounds of the natural configuration.

It is especially advantageous to formulate the inventive compositions in dosage unit forms for ease and economy of administration and uniformity of dosage. Dosage unit form as used in the specification and claims herein refers to physically discrete units suitable as unitary dosages for animal and human subjects, each unit containing a predetermined quantity of active material calculated to produce the desired biological effect in association with the required pharmaceutical means. The specifications for the novel dosage unit forms of this invention are dictated by and directly dependent on (a) the unique characteristics of the active material and the particular biological effect to be achieved and (b) the limitations inherent in the art of compounding such an active material for administration to animal and human subjects as disclosed in detail in this specification, these being features of the present invention.

Illustratively, effectiveness of the pharmaceutical preparations and methods of administration in the human female is dependent on providing thereto an effective amount of the active ingredient during a span of time starting approximately at the time of ovulation and ending approximately at or just prior to the next expected menses. Within this span wherein the preparations and methods are operable, variations in time and frequency of administration are possible provided an effective amount of the essential active ingredient is made available. This span correlates with development of a corpus luteum upon which, according to some experimental data, a luteolytic effect is exerted by the present preparations and methods. In harmony with the concept of administering to the female subject such an effective amount of the prostaglandintype ingredient in the dosage unit form of pharmaceutical preparation various embodiments are possible. Illustratively, daily intravenous infusion of a sterile aqueous pharmaceutical preparation containing the aforesaid active ingredient starting on or about the 16th day of a cycle and ending on or about the last day or two of the cycle is an effective mode of administration. This mode may be varied to allow for infusion of larger amounts on each of 2 or 3 days. Infusion administration on the second or third day prior to expected menses can be used. Another embodiment is a sterile pharmaceutical unit dosage preparation in an aqueous or oily vehicle form injected over a schedule of about one injection on each of 2 or 3 days. A further embodiment is a sterile aqueous suspension of a carboxylate ester as heretofore described or an acylate as heretofore described. In this embodiment one injection on or about the sixteenth or seventeenth day of the cycle is effective to bring about menses in the ovulating female at the usual time although sexual exposure occurs about the time of ovulation. Another embodiment is an intravaginal composition; illustratively, an intravaginal suppository administered once every 3 days starting on or about the seventeenth day of the cycle until the ensuing menses appears. Yet another embodiment is a pharmaceutical preparation adapted for sublingual or buccal administration whereby the principal active ingredient is directly available to the blood supply and thereby exerts its beneficial effect. One such pharmaceutical preparation held under the tongue until dissolved once or twice daily starting on or about the 17th day of the cycle is effective to maintain the required amount of the active prostaglandin type ingredient to prevent pregnancy during the particular cycle although ovulation and exposure to the male have occurred. Other injectables are, for example, combinations of a water soluble salt and an acylate or carboxylate ester to provide both immediate and prolonged action. A dry preparation for reconstitution as desired with an appropriate liquid, e.g., sterile saline is yet another embodiment.

The aforesaid prostaglandins are administered in dosage unit forms of pharmaceutical preparations supplying to the treated female mammal an effective amount of the essential active ingredient for control of the reproductive cycle, e.g., by ensuring a nonpregnant cycle in the female notwithstanding ovulation and contact with a fertile male as by natural coitus during the aforesaid span extending from on or about the time of ovulation to just prior to expected menses. Additionally, the ovulating female obtains regularity of the reproductive cycle by utilizing the preparations and methods of this invention, apparently due to aiding the natural cycle regression of the corpus luteum. The preparation can be in the form of a fine powder of about 25 microns or less, preferably prepared by air micronization, such powder being used as a nasal snuff or a vaginal insufflation. The powder can be suitably compounded with a compatible extender, e.g., lactose. Other pharmaceutical preparations in dosage unit form are compounded of the essential prostaglandin active ingredient and pharmaceutical means which adapt the preparation for systemic administration. The pharmaceutical preparations for administration to the humans and animals include those for injectable, nasal, sublingual, or buccal and vaginal administration. Those for injectable administration are, for example, sterile aqueous solutions, sterile aqueous suspensions, sterile oily solutions or suspensions, sterile powders for subsequent incorporation into an injectable form by addition of the required sterile vehicle, and the like. The solutions or suspensions are compounded with the required pharmaceutical means such as preservatives, suspending and dispersing agents, and isotonic agents, for example, methyl and propyl parabens, sodium chloride, polyethylene glycols, especially polyethylene glycol 4000, sodium carboxymethylcellulose, sodium alginate or polyvinyl pyrrolidone, polysorbate 80, condensation products of ethylene oxide with fatty acids, for example polyoxyethylene stearate; or with fatty alcohols, for example heptadecaethyleneoxycetanol, or with partial esters, for example polyoxyethylene sorbitol mono-oleate or hexitans derived from sorbitol, for example polyoxyethylene sorbitan mono-oleate. Preservative means such as methyl and propyl p-hydroxy benzoates are incorporated into such suspensions or dispersions. Suspensions in oily media can be prepared by dispersing the active ingredient in an acceptable oily means, for example a vegetable oil such as sesame oil, peanut oil and cottonseed oil. These may contain means to delay absorption, for example aluminum monostearate. All dosage unit forms for injectable administration must be sterile as is known and practiced in the art.

Pharmaceutical preparations for nasal administration also include sprays formulated with acceptable aqueous means, for example a buffered isotonic aqueous vehicle containing appropriate buffer salts and, for example, lactose or mannitol. The sprays can be compounded with means adapted to form an aerosol, for example, nontoxic propellants such as the known fluorinated methane and ethane. Preparations for vaginal application include the essential active ingredient reduced in particle size to a powder suitable for insufflation or suitably mixed with inert excipient means such as lactose. Such preparations also include suppositories and other formed structures such as ring devices for intravaginal use containing the essential active ingredient, for example a polysiloxane polymer device in the form of a toroid which will release the essential active ingredient during a predetermined period of time. The amount of the essential active ingredient provided by the various dosage forms is sufficient to supply a dosage of from about 0.001 mg. to about 20 mg. per kilo, preferably from about 0.01 mg. to about 20 mg. per kilo of the treated subject, depending on the desired promptness, duration and magnitude of the end result. The amount of the prostaglandin compound in the several embodiments of the invention, whether for oral, injectable, or intravaginal administration can be expressed in percentage by weight or in specific amounts. These percentages or specific amounts will vary in view of the different onset and duration of the biological effects that attend each dosage unit form. For example, a sterile aqueous suspension designed for prolonged action after one injection can contain as much as 50% by weight whereas a sterile aqueous solution as diluted with sterile saline for infusion can contain as little as 0.00005% (0.5 mg. in a 1000 ml. infusion equivalent to 0.01 mg./kilo for a 50 kilogram woman). Other infusions provide as small a dose as 0.001 mg./kilo). A sterile aqueous solution for direct intravenous administration, without infusion as with physiological saline can contain, for example, 5% or more. Dosage unit forms such as the sublingual and intravaginal types can contain as much as 200 mg. and 500 mg. respectively. Other embodiments within the inventive concept, such as oily preparation, dry preparations for suspension and solution, are designed to provide the aforesaid dosages of from about 0.001 mg. to about 20 mg., preferably from about 0.01 mg. to about 20 mg., per kilo of body weight.

Although the exact mechanism of action of the essential active ingredient of the prostaglandin type in controlling the reproductive cycle is not certain, the action manifests itself in several ways, for example, by regulating menses or heat so that the length of the cycle conforms to a predetermined span; by preventing reproduction despite ovulation and natural exposure to sperm; and by a luteolytic phenomenon involving regression of corpora lutea. This phenomenon will terminate anestrus.

The mechanism of action of the prostaglandins in the treated females is a matter for conjecture although experimental data indicate that a luteolytic mechanism and regression of the corpus luteum may be involved. A pharmaceutical preparation is made up by dissolving PGF$_2\alpha$ in physiological saline at a concentration of 125 mcg./ml. and adjusting the pH within the range of 5 to 7 with bicarbonate buffer. Cycling normal rats (200 to 300 gm.) are prepared with a right uterine cornua indwelling catheter, Weeks and Davis, J. Appl. Physiol. 19, 540 (1964). At the third normal proestrus pseudopregnancy is induced by vaginal stimulation with an electric probe. Vaginal smears are taken to confirm pseudopregnancy. On the morning of day 5 of pseudopregnancy the pharmaceutical preparation of $PGF_2\alpha$ is infused at the rate of 2.06 ml./day (1mg/kg/day) $PGF_2\alpha$. Infusions of the $PGF_2\alpha$ preparation and a like saline control are continued for 48 hours at which time the animals are sacrificed and the ovaries harvested and placed in 1 ml. of 2.5% NaOH solutions for determination of progesterone and $20\alpha$-OH progesterone. The determinations in two experiments are as listed in Table 1.

about 12 weeks of gestation. Such lawful medical abortion is usually accomplished by the present compositions and methods without lawful surgical intervention which, however, is not excluded or contra-indicated as a complementary measure. In animals, illustratively dogs and cats, the time duration within which medical abortion is accomplished varies with the species. Dogs, for example, have a gestation period of about 63 and, in the case of improper or unkown mating, medical abortion is accomplished by the present compositions and methods during the first about one third of the gestation period. Comparable methodology is applicable for other species.

The following preparations and methods describe the manner and process of making and using this invention and are to be construed as exemplary embodiments of the inventive concept and not as limitations thereof.

Table 1

The Effect of $PGF_2\alpha$ Infusion on the Concentration of Progesterone and $20\alpha$OH-Progesterone in the Ovaries of Pseudopregnant Rats

| Sample | Treatment | No. Ovaries | Ovarian Location (side) | Total Weight (mgs) | Progesterone (hg/gm tissue) | $20\alpha_n$HP (hg/gm tissue) | P/OHP Ratio |
|---|---|---|---|---|---|---|---|
| Experiment 1 | | | | | | | |
| 1 | Saline (2.06 ml./ | 2 | Right | 70.0 | 14.8 ⟩ 11.7* | 1.40 ⟩ 1.2 | 9.75 |
| 2 | day) infused into right uterine horn | 2 | Left | 67.3 | 8.6 ⟋ | 0.90 ⟋ | |
| 3 | $PGF_2\alpha$ (1 mg/kg/ | 3 | Right | 129.8 | 4.1 ⟩ | 18.7 ⟩ | |
| 4 | day into right | 2 | Right | 94.9 | 2.8 ⟩ 2.8 | 4.1 ⟩ 11.9 | 0.24 |
| 5 | uterine horn | 3 | Left | 150.9 | 3.0 ⟋ | 13.6 ⟋ | |
| 6 | | 2 | Left | 89.7 | 1.4 ⟋ | 11.5 | |
| Experiment 2 | | | | | | | |
| 1 | Saline (2.06 ml/kg/ | 3 | Right | 291.4 | 4.12 ⟩ | 4.80 ⟩ | |
| 2 | day) into right | 3 | Right | 203.5 | 7.02 ⟩ 5.56 | 5.00 ⟩ 4.9 | 1.13 |
| 3 | uterine horn | 3 | Left | 182.8 | 4.61 ⟋ | 5.60 ⟋ | |
| 4 | | 3 | Left | 280.3 | 6.47 ⟋ | 4.10 | |
| 5 | $PGF_2\alpha$ (1 mg/kg/ | 3 | Right | 164.8 | 0.87 ⟩ | 13.9 ⟩ | |
| 6 | day) into right | 3 | Right | 218.5 | 0.39 ⟩ 0.67 | 7.9 ⟩ 10.1 | 0.06 |
| 7 | uterine horn | 3 | Left | 131.4 | 0.53 ⟋ | 9.0 ⟋ | |
| 8 | | 3 | Left | 207.1 | 0.90 ⟋ | 9.4 | |

*Average values for each group

The data show that the effect of the $PGF_2\alpha$ administration is a reduction of progesterone content and an increase in the reduced steroid content, thus indicating a luteolytic action through failure of effective progesterone content.

The beneficial action in controlling the reproductive cycle manifests itself, for example, in preventing reproduction despite ovulation and natural exposure to sperm. Absence, reduction and resorption of implantation sites in animals is a manifestation of the beneficial action in controlling the reproductive cycle. Expulsion of an embryo or fetus is another manifestation. In animals, for example dogs and cats, such expulsion is often deemed desirable in the case of improper or unknown mating. At about one third, or in some cases, a longer portion of the gestation period in animals such as dogs and cats, actual expulsion occurs. Earlier, resorption follows treatment with the present preparations and methods. In the human, the first about 16 weeks of gestation is the duration of time within which lawful medical abortion by expulsion of the embryo or fetus is deemed sound, especially by about the 10th week following the first missed menses, this being equivalent to

EXAMPLE 1

Intravenous infusion of pharmaceutical preparation $PGF_2\alpha$ is made up in sterile saline solution at a concentration of 0.5 mg./ml. and used for administration by infusion in female rats. Spartan Sprague-Dawley rats are used. Males are experienced breeders and females (225–275 gm. body wt.) have typical vaginal estrus cycles. Indwelling right heart cannulas are inserted during proestrus. After cannulation, daily vaginal smears are again taken to insure maintenance of normal cyclicity. Initially infusion of $PGF_2\alpha$ (3.2 mg./kg./day in saline) commences at 4:00 p.m. the afternoon before mating and continues for 6 additional days. The starting time of the infusion is later modified to commence on the morning following mating because of an adverse affect on mating behavior of the environment associated with the infusion equipment. The day of finding sperm in the vagina is considered Day 1 and the males are removed from the females at this time.

On Day 8, an exploratory laparotomy is performed under ether anesthesia via an abdominal midline incision. Uteri are checked for number, size, and distribution of implantation sites taking care to minimize any handling of the reproductive tract. Incisions are closed with surgical silk, the animals returned to their original cages. On Day 18 females are placed in casting boxes. At parturition or on Day 23 animals are sacrificed and the number and condition of the young are determined.

RESULTS:

Six of eight rats infused with saline only conceive. Those animals average 11.7 implantation sites at Day 8, and 7.8 develop fetuses.

Three of 11 $PGF_2\alpha$ treated rats conceive. Implantation sites of one of these three are barely detectable at Day 8, no indication of pregnancy is evident at autopsy on Day 23. The remaining two have implants of normal size, on the low side of the average number and, in one rat, are predominately in the anterior half of the uterine cornu. Five fetuses at term appear normal by gross inspection.

EXAMPLE 2

Subcutaneous administration of pharmaceutical preparation

Prostaglandin ($PGF_2\alpha$) is made up in sterile saline solution at a concentration of 0.8 mg./ml. and used for subcutaneous administration in female rats. Spartan Sprague-Dawley rats are used. Males are experienced breeders and females (225–275 gm.) have typical estrous cycles. Males are placed with females during proestrus and allowed to remain overnight. The following morning females are examined for vaginal plugs and the presence of sperm. Animals with vaginal sperm are started on test, the day of finding sperm being considered Day 1.

A. 3.2 mg./kg. of $PGF_2\alpha$ is injected subcutaneously daily in two evenly divided dosages. Animals are sacrificed on Day 8 at which time the number and size of implants are recorded. The results are in Table 2.

B. Females are injected subcutaneously, b.i.d., on days 4, 5 and 6 with either 0.1 mg., 0.2 mg., 0.4 mg., or 0.8 mg. of $PGF_2\alpha$ per day. The rats are sacrificed on Day 15. At the time of sacrifice the number, size and distribution of implants are recorded. The results are in Table 3.

EXAMPLE 3

Subcutaneous administration of pharmaceutical preparation $PGF_2\alpha$ is made up in sterile physiological saline at a concentration of 10 mg./ml. and used for subcutaneous administration in female rabbits.

Mature virgin Dutch rabbits weighing about 1.5 kg. each are used. Each of 10 females is mated twice with two different proven males and the day of finding sperm in the vaginas of the female rabbits is Day 1. Thereafter, subcutaneous injections are begun on Day 4 with the mated animals divided into five groups each.

In group I each rabbit receives two subcutaneous injections per day of the pharmaceutical preparation providing a total daily dosage of 5 mg./kg./day of the $PGF_2\alpha$. In Group II each of the five mated female rabbits receives two like daily injections subcutaneously of 0.5 ml. of physiological saline.

Table 2

Effect of $PGF_2\alpha$ Injected Subcutaneously

| Treatment | Dose b.i.d. | Days Injected | Total Dose (mg)-No. of rats | No. of rats with Implantation sites | Average No. of Implants |
|---|---|---|---|---|---|
| Physiological Saline | 0.5 cc | Day 1–7 | 0.0 (5) | 4 | 11.2 |
| $PGF_2\alpha$ | 0.4 mg/0.5cc | Day 1–7 | 5.6 (5) | 0 | — |
| " | " | Day 3–7 | 4.0 (4) | 0 | — |
| " | " | Day 5–7 | 2.4 (4) | 1 | 13 |
| " | " | Day 6–7 | 1.6 (4) | 3 | 14 |
| " | " | Day 6 | 0.8 (2) | 2 | 8 |
| " | " | Day 7 | 0.8 (2) | 2 | 14.5 |
| " | " | Day 1–7 | 5.6 (3) | 0 | — |
| " | " | Day 1–5 | 4.0 (4) | 2 | 11.5 |
| " | " | Day 1–3 | 2.4 (4) | 4 | 13 |
| " | " | Day 2–4 | 2.4 (4) | 3 | 7.6 |
| " | " | Day 3 | 0.8 (2) | 2 | 8.5 |
| " | " | Day 2 | 0.8 (1) | 1 | 12 |

Table 3

Effect of $PGF_2\alpha$ when injected Subcutaneously on Days 4, 5 and 6

| Treatment | Dose b.i.d. | Total Dose (mg)-No. of rats | Day 15 No. of rats with Inplantation sites | Av. No. of Implants |
|---|---|---|---|---|
| Physiological Saline | 0.5 cc | 0.0 (3) | 3 | 12.7 |
| | 0.05 mg | 0.3 (3) | 2 | 10.5 |
| | 0.1 " | 0.6 (3) | 2 | 10.0 |
| | 0.2 " | 1.2 (3) | 2 | 5.0 |
| | 0.4 | 2.4 (3) | 0 | — |

The injections are given on each of 5 days and thereafter on Day 12 the animals are sacrificed and autopsied. In none of the rabbits injected with the $PGF_2\alpha$ preparation are implantation sites found at autopsy. In the other group of saline-treated controls four of the 5 rabbits have implantation sites with the number of implants being respectively 8, 5, 8 and 8. The fifth animal in this group shows no evidence of implantation sites.

EXAMPLE 4

Intravaginal administration of suppository $PGF_2\alpha$ is made up in a suppository base containing 2 parts by weight of polyethylene glycol 6000 and one part by weight of polyethylene glycol 1500. The suppositories are formed into pellets with a volume of approximately 1 ml. The suppositories for administration of the prostaglandin contain 8 mg. each of the $PGF_2\alpha$ prostaglandin material.

Ten female rabbits are each mated twice with two different proven males and the day of finding of sperm in the vagina is taken as Day 1. Each rabbit is treated once on days 4, 5, 6, 7, and 8 for a total of 5 days. Since the individual rabbits weigh about 1.6 kg., the dosage of the prostaglandin material in the medicament-treated animals is 5 mg./kg./day.

In none of the five prostaglandin-treated rabbits are implantation sites found upon autopsy on Day 12. In each of the five control rabbits treated with saline there are implantation sites averaging 6, 5, 5, 7 and 9 sites respectively.

EXAMPLE 5

Aqueous solution

Mature female rhesus monkeys (5–6 kg.) are mated naturally at a time and for a duration of the reproductive cycle calculated to maximize the chances of conception. The day of ovulation is determined by following peripheral blood progestin levels, and ovulation is confirmed by laparotomy. Prostaglandin $F_2\alpha$ ($PGF_2\alpha$) is dissolved 25 mg./ml. in ethanol and diluted to 15 mg./ml. with a sterile aqueous methylcellulose vehicle (0.25%). This prostaglandin preparation is injected subcutaneously b.i.d., 30 mg./day for 5 days. Injection is initiated on Day 7 after the presumed day of ovulation in one animal, female No. 16–M. The other three test animals are injected on Days 11 to 15 post ovulation. Peripheral plasma progestin levels are followed during the cycle current to the time of injection. Pregnancy is diagnosed by rectal palpation to determine uterine enlargement. All test animals are observed for systemic signs of drug toxicity during the course of the experiment.

Peripheral blood progestin levels are not completely depressed by initiating prostaglandin injection on Day 7. However, progestin levels fall precipitously almost to non-detectable levels in three test animals following the initiation of drug injection on Day 11. This drop in progestin level is followed by onset of menses on the 2nd, 3rd, and the 4th day of injection. One of the four test animals, No. 2–M is diagnosed pregnant 40 days after mating. Previous control fertility and a confirmed pregnancy in a concurrent control animal indicate planned mating under the conditions of this experiment results in a 75–80% fertility rate.

No systemic signs of drug toxicity are noted in any of the animals in the present experiment. Slight tissue necrosis at some of the injection sites and a general tightening of the skin in the local area of injection are noted.

EXAMPLE 6

Sterile Aqueous Suspension

A sterile vehicle is prepared to contain in each milliliter 30 mg. of polyethylene glycol 400 U.S.P and 2.9 mg. of preservative. Sterilization is accomplished by filtration thru a sterile clarifying pad.

2.2 liters of suspension is prepared to contain 400 mg. per ml. of the acetate of $PGF_1\alpha$.

|  | Each ml. | Total |
|---|---|---|
| Acetate of $PGF_1\alpha$ Sterile, micronized | 400 mg. | 898 Gm. |
| Sterile Vehicle |  | 1496 Gm. |

Add the sterile acetate to about 95% of the required vehicle until a smooth suspension is obtained. Add the balance of the sterile vehicle and mix well. Pass the whole thru a sterile mill and collect in a sterile container.

Intramuscular injection of 1 ml. to the ovulating human 1 day after coitus during the fertile period is followed by menses at the usual time.

The acetate is replaced by the butyrate, propionate or aforesaid similar acylate or by the methyl, ethyl or similar ester of $PGF_1\alpha$ with like results.

EXAMPLE 7

Sterile Aqueous Solution

A sterile aqueous solution for intravenous infusion administration is prepared from the following ingredients to contain 25 mg. per ml. of the sodium salt of $PGF_3\alpha$.

| Sodium $PGF_3\alpha$ | 25 Gm. |
|---|---|
| Lactose Hydrous | 50 Gm. |
| Sodium Biphosphate anhydrous | 1.6 Gm. |
| Sodium Phosphate Exsiccated | 17.5 Gm. |
| Water for injection q.s. ad | 1000 ml. |

One milliliter is administered by intravenous infusion to the ovulating human female after intercourse during the fertile period of the cycle. The infusion is given 2 days before expected onset of menses. It can be repeated on the day before expected menses. Lesser amounts of the active ingredient can be used for infusions given on 3 or 4 days or on several days. Thereafter menses occurs at the usual time in the menstrual cycle.

EXAMPLE 8

Intravaginal Suppository

Intravaginal suppositories are prepared to contain in each suppository 250 mg. of prostaglandin $PGF_2\alpha$. One thousand suppositories are prepared by moulding a mixture of the following ingredients:

| $PGF_2\alpha$, micronized | 250 Gm. |
|---|---|
| Polyethylene glycol 6000 | 650 Gm. |
| Lactose | 100 Gm. |

Starting on the second day post-ovulation one suppository is used intravaginally each day in the ovulating human female with the result that menses occurs on the 28th day of a normal 28-day menstrual cycle.

EXAMPLE 9

Intravaginal Device

An intravaginal device in the form of a toroid is prepared to contain 700 mg. of dihydro $PGF_1\alpha$ dispersed in the toroid. The prostaglandin-type active ingredient is dispersed throughout a vulcanizable polysiloxane polymer which is then moulded in a ring structure to provide a toroid for placement in the vaginal tract. The toroid ring structure is inserted into the vagina after ovulation where it releases the active ingredient and exerts its beneficial biological effect with menses following at the expected time in the menstrual cycle. At that time the intravaginal device is removed. Like results are obtained with an annular ring coated with the prostaglandin.

EXAMPLE 10

Sublingual Administration 1000 tablets are prepared from the following ingredients, each containing 50 mg. of active ingredient.

| | |
|---|---|
| $PGF_2\alpha$, micronized | 50 Gm. |
| Polyethylene glycol 4000, powdered | 150 Gm. |
| Polyethylene glycol 6000, powdered | 75 Gm. |

The materials are mixed well and compressed into sublingual-type tablets of the proper weight. At the time of ovulation the human female uses one under the tongue and one daily there after to ensure menses will occur at the end of the normal menstrual cycle in the particular female.

EXAMPLE 11

Sterile Aqueous Solution

A sterile aqueous solution containing in each milliliter 50 mg. of $PGF_3\alpha$ is prepared from the following ingredients:

| | |
|---|---|
| $PGF_3\alpha$ | 50 Gm. |
| Ethanol | 300 ml. |
| Water for injection q.s. ad | 1000 ml. |

The $PGF_3\alpha$ is dissolved in the ethanol and then carefully diluted with the sterile water for injection. Thereafter the whole is sterilized by sterile filtration. One milliliter injected intravenously into an ovulating bitch on the 10th and 15th days after sexual contact with a known fertile stud is beneficial in insuring that the usual heat period will take place in the bitch indicating that pregnancy is prevented.

EXAMPLE 12

Subcutaneous Administration $PGF_2\alpha$ is prepared in sterile aqueous physiological saline (0.9%) at a concentration of 5 mg./ml and used for subcutaneous injection in an ovulating human at about 9 weeks of gestation. Two milliliters providing a total dosage of 10 mg. of the active prostaglandin is injected. Thereafter, at about 8 hours post injection, the gestation period is successfully interrupted and continuation of the reproductive cycle is prevented.

The racemic form of $PGF_2\alpha$ is used in another patient at about ten weeks of gestation in a dosage of 15 mg. Comparable results are obtained.

EXAMPLE 13

Subcutaneous Administration

The sterile physiological saline pharmaceutical preparation of Example 13 is administered to an ovulating human at about 16 weeks into the gestation period. A dose of 2 milliliters, equivalent to a dosage total of 10 mg., is injected subcutaneously. Thereafter, at about 16 hours post injection, the lawful medical abortion is completed and continuation of the reproductive cycle is prevented.

EXAMPLE 14

Intravenous Infusion 50 mg. of $PGE_2$ is dissolved in 5 ml. of ethanol. 0.5 ml. of this solution is diluted with sterile saline (about 0.9% Nacl) to 2500 ml. to obtain a solution containing 2 mcg. per ml. Intravenous infusion is carried out on an ovulating human about 15 weeks into the gestation period. The infusion of 75 ml. is completed during approximately 1 hour and the total dose provided is 150 mcg. of $PGE_2$. Thereafter, at about 12 hours post-infusion, lawful medical abortion ensues and is completed satisfactorily.

An additional human patient at about twelve weeks into the gestation period is infused intravenously with a total dose of 2 mg. of $PGE_2$ in about 24 minutes. Within about 8 hours successful, lawful medical abortion occurs.

Comparable lawful medical abortion results are accomplished with infusion of the racemic form of $PGE_2$.

EXAMPLE 15

Subcutaneous Administration

Starting at 24 days into the gestation period a bitch canine is injected subcutaneously, b.i.d. × 3 days, with an aqueous sterile saline preparation providing in each injection 2.5 mg/kilo of $PGF_1\alpha$. Medical abortion ensues within about 5 days after the last injection.

EXAMPLE 16

Subcutaneous Administration

The active prostaglandin compounds are dissolved in ethanol at a concentration of 100 mg/ml. This concentrated solution is diluted with sterile vehicle (0.25% methyl cellulose in water) to provide various concentrations depending on the dosage of active ingredient to be given.

Injections of 1 ml. are given twice daily to gestating rhesus monkeys each weighing about 5 kg. Results are as follows:

| Animal No. | Prostaglandin Injected** | Stage of Pregnancy* | Abortion Results |
|---|---|---|---|
| 1 | $F_2\alpha$, | 15 mg × 5 | Day 35 | + |
| 2 | " | 15 mg × 4 | 33 | + |
| 3 | " | 15 mg × 3 | 33 | — |
| 4 | " | 15 mg × 3 | 40 | + |
| 5 | " | 15 mg × 3 | 36 | + |
| 6 | " | 15 mg × 2 | 35 | + |

-Continued

| Animal No. | Prostaglandin Injected** | Stage of Pregnancy* | Abortion Results |
|---|---|---|---|
| 7 | " | 15 mg × 2 | 35 | + |
| 8 | " | 15 mg ×3 | 45 | — |
| 9 | " | 15 mg × 4 | 62 | — |
| 10 | " | 15 mg × 2 | 70 | — |
| 11 | " | 5 mg × 4 | 33 | — |
| 12 | " | 5 mg × 4 | 38 | — |
| 13 | " | 10 mg × 2 | 30 | — |
| 14 | " | 20 mg × 1 | 40 | — |
| 15 | E$_2$, | 15 mg × 4 (T) | 42 | — |
| 16 | E$_2$, | 15 mg × 4 (T) | 36 | + |

*Day treatment was initiated
**Dose/injection and amount injected
+ Abortion occurs within 1 to 3 days post-injection as evidenced by heavy vaginal bleeding
(T) There is evidence of toxicity with the F$_2$ injections at this dosage Other embodiments in the various dosage unit forms are prepared with the additional compounds represented by the formulae heretofore described and used with like beneficial results in the control of the reproductive cycle.

Additional compounds include, for example, as pharmaceutically acceptable salts, the alkali metal salts such as the sodium and potassium salts; as carboxylate esters, alkyl esters having 1 to 6 carbon atoms inclusive, especially the methyl and ethyl esters, and as acylates, alkanoates wherein the alkyl radical has 1 to 6 carbon atoms inclusive, especially the acetate. Examples are the sodium and potassium salts of PGF$_2\alpha$, the methyl and ethyl esters of PGF$_2\alpha$, and the acetate of PGF$_2\alpha$ and the like alkali metal salts, alkanoates, and alkyl esters of PGF$_1\alpha$, PGF$_2\alpha$, PGF$_3\alpha$, dihydro-PGF$_1\alpha$, PGE$_1$, PGE$_2$, PGE$_3$ and dihydro-PGE$_1$.

A beneficial additional active ingredient which however is not necessary in the embodiments of the inventive concept is an estrogenic substance, i.e., a naturally occuring or synthetic substance known in the art to evoke typical changes in the accessory sex organs of females; namely, thickening of vaginal mucosa, hypertrophy of the myometrium and proliferation of the endometrium. Illustratively, these substances are estriol, estrone, estradiol, estradiol cyclopentylpropionate, estrogenic substances conjugated, ethinyl estradiol, ethinyl estradiol 3-methyl ether, piperazine estrone sulfate, benzesterol, dienesterol, diethylstilbesterol dipropionate, hexesterol, methallenstril and the like. These are used in amounts known in the art to be sufficient to provide the aforesaid typical changes.

The compositions and methods also utilize for especially beneficial effects in controlling the reproductive cycle as described, mixtures of the active ingredients, preferably a mixture of PGF and PGE-type compounds, especially a mixture of PGF$_2\alpha$ and PGE$_2$, and a mixture of racemic PGF$_2\alpha$ and racemic PGE$_2$.

I claim:

1. A method of accomplishing a medical abortion in an ovulating human which consists essentially of providing to said human in a span of time beginning at about the time of implantation and ending at about the first 16 weeks of the gestation period an effective amount for accomplishing the medical abortion of a member selected from the group consisting of the free acids, pharmaceutically acceptable salts, and alkyl esters having 1 to 6 carbon atoms, inclusive, in the alkyl portion, of a compound represented by the formula

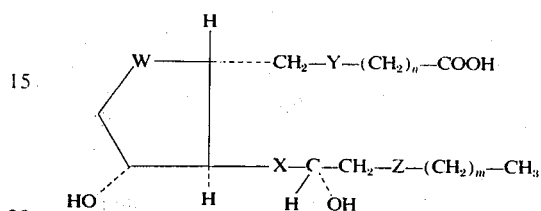

wherein W is $=C=O$ or ;

wherein X is —CH$_2$CH$_2$— or trans—CH=CH— and Y and Z are —CH$_2$CH$_2$—, or wherein X is trans—CH=CH—, Y is cis—CH=CH—, and Z is —CH$_2$CH$_2$— or cis—CH=CH—; and wherein $m$ is 0, 1, or 2 and $n$ is 2, 3, 4 or 5, in a dosage unit form compounded with pharmaceutical means which adapt the form for systemic administration.

2. A method according to claim 1 wherein W is $=C=O$.

3. A method according to claim 2 wherein $m$ is 1 and $n$ is 3.

4. A method according to claim 1 wherein said member is PGE$_2$.

5. A method according to claim 1 wherein said member is PGE$_2$ in salt form.

6. A method according to claim 1 wherein said member is PGE$_2$ in alkyl ester form.

7. A method according to claim 1 wherein W is $$=C\diagdown^H_{OH}.$$

8. A method according to claim 7 wherein $m$ is 1 and $n$ is 3.

9. A method according to claim 1 wherein said member is PGF$_2\alpha$.

10. A method according to claim 1 wherein said member is PGF$_2\alpha$ in salt form.

11. A method according to claim 1 wherein said member is PGF$_2\alpha$ in alkyl ester form.

* * * * *